(12) United States Patent
Forbord et al.

(10) Patent No.: US 6,236,533 B1
(45) Date of Patent: May 22, 2001

(54) CABLE CONNECTOR CONFORMABLE TO DISC DRIVE HOUSING

(75) Inventors: Kent J. Forbord, St. Louis Park; Michael D. Schroeder, Webster, both of MN (US)

(73) Assignee: Seagate Technolgy LLC, Scotts Valley, CA (US)

( * ) Notice: Subject to any disclaimer, the term of this patent is extended or adjusted under 35 U.S.C. 154(b) by 0 days.

(21) Appl. No.: 09/104,948

(22) Filed: Jun. 25, 1998

Related U.S. Application Data (60) Provisional application No. 60/057,955, filed on Sep. 5, 1997, and provisional application No. 60/063,322, filed on Oct. 27, 1997.

(51) Int. Cl.[7] ................................................. G11B 33/12
(52) U.S. Cl. ..................................... 360/98.01; 360/97.01
(58) Field of Search .............................. 360/97.01, 98.01; 361/685, 686; D13/133; 439/79, 120, 248

(56) References Cited

U.S. PATENT DOCUMENTS

| | | | |
|---|---|---|---|
| 5,420,733 | * 5/1995 | Knighton et al. | 360/97.01 |
| 5,477,401 | 12/1995 | Squires et al. | 360/97.02 |
| 5,590,001 | 12/1996 | Ino et al. | 360/97.02 |
| 5,596,461 | * 1/1997 | Stefansky | 360/98.01 |
| 5,602,700 | 2/1997 | Viskochil et al. | 360/97.02 |
| 5,703,734 | * 12/1997 | Berberich et al. | 360/97.02 |
| 5,862,011 | * 1/1999 | Sega et al. | 360/98.01 |
| 5,881,454 | * 3/1999 | Baxter et al. | 360/97.01 |
| 6,036,507 | * 3/2000 | Knighton et al. | 439/79 |

* cited by examiner

Primary Examiner—Craig A. Renner
(74) Attorney, Agent, or Firm—Shawn B. Dempster (57) ABSTRACT

A cable connector includes a connector housing mounted to an edge of a circuit board so that the connector is electrically connected to circuits on the circuit board. The circuit board and cable connector are mountable to a disc drive housing. The cable connector housing has an external configuration conforming to at least a portion of the disc drive housing. A plurality of contacts are supported by the connector housing for receiving a connector electrically connected to external circuits.

2 Claims, 11 Drawing Sheets

CABLE CONNECTOR CONFORMABLE TO DISC DRIVE HOUSING

CROSS-REFERENCE TO RELATED APPLICATION(S)

This application claims priority from U.S. Provisional Application No. 60/057,955, filed Sep. 5, 1997 for "Ultra High Performance Disc Drive" by Kent J. Forbord and from U.S. Provisional Application No. 60/063,322, filed Oct. 27, 1997 for "Ultra High Performance Disc Drive" by Kent J. Forbord.

BACKGROUND OF THE INVENTION

This invention relates to magnetic disc drive assemblies of the class employing a stack of rigid discs in a standard housing profile.

Magnetic disc drive assemblies employing rigid, or hard, discs are commonly used in desktop and other computer mainframes as a principal memory for the computer. Currently, rigid disc magnetic disc drive assemblies are available in three different standard footprints, commonly known as 2½ inch, 3½ inch and 5¼ inch drives. These standard drives are available in several configurations, the most common being known as low-profile and half-high drives. The principal difference between a low-profile drive and a half-high drive is that a low-profile drive typically has half the number of rigid discs in the disc stack, and hence half the data storage capacity, as a half-high drive. Computer manufacturers design their computer models to accommodate one of these three standard footprints and one of the two configurations. Consequently, disc drive manufacturers produce disc drives having a form and fit meeting the standard configuration of one of the three footprints and one of the two heights.

As used herein, the term "footprint" refers to the two-dimensional plan or layout of an element at a given plane, such as the mounting layout of the element. The "footprint" of a disc drive is, therefore, the two-dimensional plan of the disc drive housing at a given plane, such as its mounting layout within the computer. The term "real estate" as used herein, refers to the three-dimensional space or volume required by an element in its operational mode. "Real estate" also refers to the space or volume required to perform an operation. Therefore, the "real estate" required for an E-block assembly is the volume required for the E-block in its full rotational pattern, as well as any space required for its installation and routine repair. The term "configuration" as used herein, refers to the three-dimensional layout or plan of an element; the "configuration" of a disc drive being the three-dimensional layout or plan of the space taken by the disc drive housing.

There is a continuing need for faster computers with greater capacity. This need is met in the disc drive industry by a combination of factors, including increasing density of data recorded on discs, increasing data transfer rates between the disc and the electronics, shortening the seek time of movement of a transducing head to a desired track on a disc, and reducing the latency to reaching a desired location on a track, among others. With increasingly improved discs, it is possible to pack more data into a given area of a disc. With increasingly more precise transducing heads, it is possible to transduce data to and from high density discs. With increasingly improved circuits, it is possible to respond to data at higher data rates. With lighter and shorter actuator arms it is possible to reduce seek times for the transducing heads. With increasingly improved spindle motors, it is possible to spin the discs faster to thereby improve data rates and reduce latency. It will be appreciated, however, that certain trade-offs are required for a given configuration of disc drives. More particularly, shorter actuator arms require smaller discs, meaning there is less disc surface on which to record data. Increased disc speed requires more power, generating more heat which requires dissipation. Given the constraint that the overall profile of the disc drive housing must conform to one of the standards, as may be required by the computer manufacturer into which the drive is to be assembled, additional trade-offs may be required to accommodate the specifications for the computer manufacturer.

The present invention is directed to a disc drive having a standard housing configuration containing a stack of rigid recording discs that are rotated at increased speed without increasing the power consumption of the drive. The present invention is also directed to a disc drive having a standard housing configuration containing a stack of rigid recording discs having smaller than standard diameters without reducing the data capacity of the drive. The present invention is also directed to a disc drive having a standard housing configuration containing a stack of rigid recording discs having smaller than standard diameters and a shorter actuator arm for reduced seek times.

BRIEF SUMMARY OF THE INVENTION

In one aspect of the present invention, a cable connector includes a connector housing mounted to an edge of a circuit board so that the connector is electrically connected to circuits on the circuit board. The circuit board and cable connector are mountable to a disc drive housing. The cable connector housing has an external configuration conforming to at least a portion of the disc drive housing. A plurality of contacts are supported by the connector housing for receiving a connector electrically connected to external circuits.

In one form, the disc drive housing has an end surface having a curved edge, and the connector housing has a surface having a recess conforming to and receiving the curved edge of the disc drive housing.

In another aspect of the present invention, a disc drive assembly includes a disc drive housing defining a disc drive chamber containing a stack of rotatable rigid recording discs. An electric motor is operatively coupled to the stack of discs for rotating the discs. An actuator assembly supports transducers for reading data to and writing data from selected discs. An electric motor is operatively coupled to the actuator assembly for positioning the transducers to selected positions relative to the discs. A circuit board is mounted to a surface of the disc drive housing and provides electrical connection to the electric motors and the transducers. A cable connector is mounted to an edge of the circuit board electrically connected to circuits on the circuit board. The cable connector includes a connector housing mounted to the circuit board, the connector housing having an external configuration conforming to at least a portion of the disc drive housing. A plurality of contacts are supported by the connector housing for receiving a connector electrically connected to external circuits.

DETAILED DESCRIPTION OF THE PREFERRED EMBODIMENTS

Figure 1:
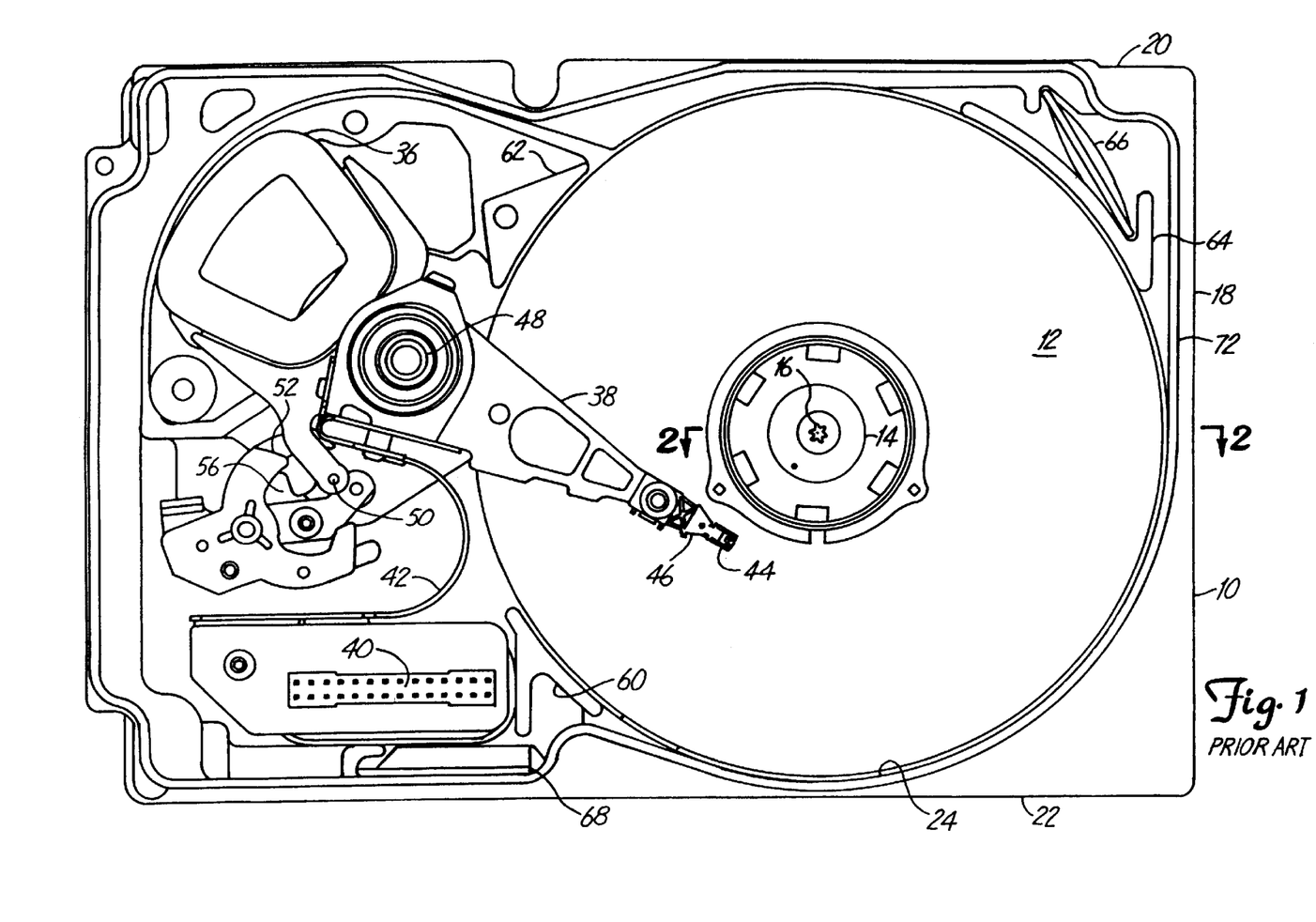
FIG. 1 is a top plan view of a standard magnetic disc drive, with the top cover removed, as in the prior art.
Figure 2:
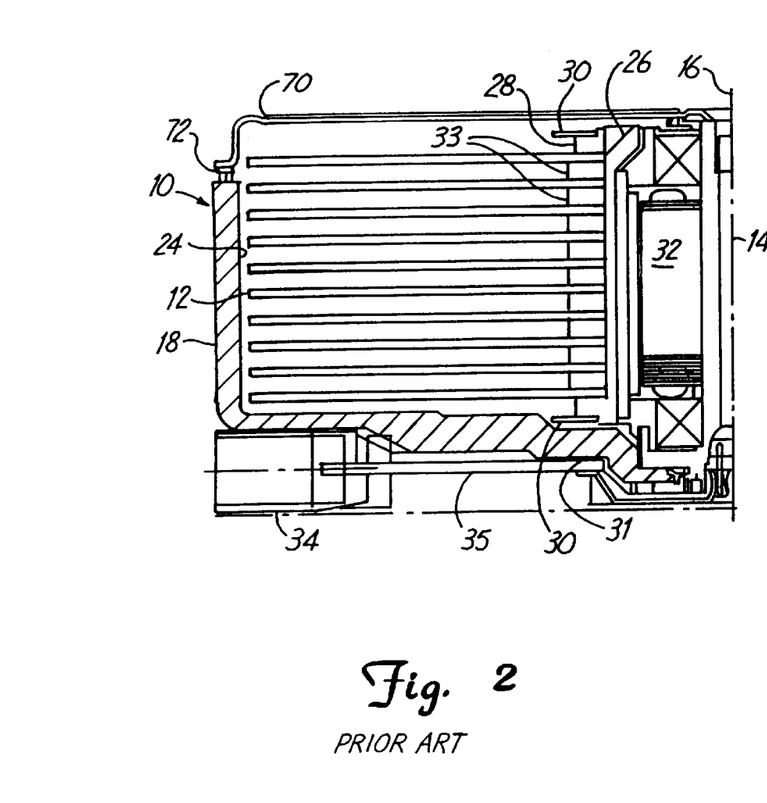
FIG. 2 is a partial section view of the disc stack and spindle assembly of the disc drive illustrated in FIG. 1, taken at line 2—2 in FIG. 1.

FIG. 1 is a top view, and FIG. 2 is a section view taken at line 2—2 in FIG. 1, of a standard 3½ inch half-high disc drive as in the prior art. The disc drive includes a housing 10 having a standard footprint that is 101.6 millimeters (4.0 inches) wide and 146 mm (5.75 inches) long. A stack of discs 12 are mounted to a disc spindle 14 centered on an axis 16 that is located 50.8 mm (2.0 inches) from one short side 18 and both long sides 20 and 22 of housing 10. Discs 12 have a diameter of 95 millimeters (3.74 inches) and are stacked on spindle 14 within a cylindrical receiver portion of housing 10 defined by inner cylindrical surface 24. Surface 24 has a radius of approximately 48.3 mm (1.9 inches), centered on axis 16. It will be appreciated that the thickness of the walls of housing 10 at the points where surface 24 is closest to the external sides 18, 20 and 22, is about 2.5 mm (0.1 inches).

As shown particularly in FIG. 2, the stack of discs comprises ten concentric discs 12 mounted to an aluminum hub 26 by clamp ring 28. Balance shims 30 positioned on the clamp ring and the lower portion of hub 26 provide balance to the stack of discs to prevent wobble as the discs spin. Each disc has a thickness of approximately 0.8 mm (0.0315 inch) and spacers 33 space the discs from each other by approximately 1.84 mm (0.0725 inch). As shown, spacers 33 extend radially from spindle axis 16 by a design width greater than the radial width of clamp ring 28. The radial extent of spacers 33 define the position of the innermost track on discs 12. The radius of the clamp ring is smaller than the radius of the spacers. The stack height of a full stack of ten discs (between the top surface of the top disc and the bottom surface of the bottom disc) is approximately 24.6 mm (0.9675 inch). Motor 32 is mounted to spindle 14 to rotate discs 12 at a design speed of 7200 revolutions per minutes (rpm). The disc drive illustrated in FIGS. 1 and 2 has a track density of 8250 tracks per radial inch (325 tracks per radial millimeter) of each disc. With ten discs as described, the disc drive of the prior art has a data capacity of about 18 gigabytes.

Input/output cable connector 34 is a female connector that mates with a corresponding standard male connector (not shown) connected to external circuitry (not shown). Connector 34 is connected to circuit board 35 that nests beneath the disc drive at an underportion of housing 10. Due to its configuration, connector 34 requires more space adjacent side 18 of the housing than board 35 requires more centrally. Connector 34 and circuit board 35 provide power and control inputs for motor 32 as well as signal and power inputs and outputs for other portions of the disc drive to be described. Circuit board 35 may also include data processing circuits used in reading and writing data from and to the recording surfaces on the discs. Typically, additional printed circuits (not shown) are formed in housing 10 on a bottom surface for distribution of signals to voice coil motor 36 (FIG. 1) for E-block 38, as well as to bulkhead connector 40. Bulkhead connector 40 is connected to flex circuit 42, which in turn spans the space and is connected to conductors on E-block 38. The conductors on the E-block extend to magnetic transducing heads on sliders 44, one slider being mounted to each load arm 46 at the end of the actuator arms of E-block 38. Load arms 46 support gimbal suspensions that support head/slider devices. Slider 44 "flies" over the respective disc surface on an air bearing created by rotation of the disc.

As is well known in the art, there is a separate load arm 46 and gimbal/slider/head 44 for each of the twenty disc surfaces of the ten discs 12. The twenty load aims 46 are mounted to eleven actuator arms of the E-block for rotation about axis 48 under the influence of voice coil motor 36. A latch pin 50 is mounted to arm 52 of E-block 38 to react against stop surfaces (not shown) rigidly mounted to the lower wall or deck of housing 10 to limit the rotational travel of the E-block to thereby define the inner and outer tracks on discs 12. The engagement of latch pin 50 to a stop surface limits the rotational travel of E-block 38 about the axis 48 of the actuator arm, thereby defining stop positions for the stop arm that in turn define the inner and outer tracks of the discs. In the prior art 3½ inch disc drive, the inner data track radius is 20.4 mm (0.804 inches) and the outer data track radius is 45.7 mm (1.8 inches) from spindle axis 16 of discs 12.

Conveniently, a latch mechanism 56 is mounted to housing 10 to engage E-block 38 when the actuator assembly is in a rest or shipping position at an inner track of discs 12. Latch mechanism 56 is mounted to the bottom wall of housing 10 in the space adjacent flex cable 42. It will be appreciated that flex cable 42 requires a volume of space (real estate) to fold or bend within the housing as E-block 38 rotates to position the heads at selected radial positions relative to the discs. Desiccant package 68 is positioned between bulkhead connector 40 and side wall 22 of housing 10.

A stainless steel cover 70 (FIG. 2) is fastened to the top surface of housing 10 with a gasket 72 to thereby seal the contents of the housing and protect the disc drive from contaminants that might otherwise enter the drive. Conveniently, a desiccant packet 68 is inserted into the disc drive prior to final assembly of flex cable 42 and cover 70 to housing 10 to maintain the humidity within the disc drive to a design level. With the cover in place, the overall height of the disc drive is 41.15 mm (1.62 inches).

It will be appreciated that the space within housing 10 of the disc drive illustrated in FIGS. 1 and 2 is occupied with the various parts of the disc drive. Real estate is at a premium, restricting optimal layout of additional electronics or mechanical features to improve the disc drive performance.

It will also be appreciated that the outer edges of the discs are moving at a linear rate of approximately 1,615 inches per second (ips) (63.58 mm/s). The relative movement of the disc to the transducer slider creates an air bearing on which the slider flies. However, the rotating disc also pumps air into and out of the space between the discs, creating a turbulent air flow pattern in that space. This turbulence creates varying air velocities and pressures within the disc drive which excite the disc assembly into resonance. Resonance within the disc assembly creates mechanical movements, resulting in transducer or head positioning errors which can adversely affect the performance of the disc drive or adversely limit track density. Baffles 60, 62, and 64 are often employed about the outer periphery of the discs to channel air movement and reduce air turbulence within the disc drive, thereby reducing drag on the discs and the power required to rotate the discs. Conveniently, filter 66 may be employed to filter contaminants from the air.

A "low-profile" version of the disc drive illustrated in FIG. 1 and 2 comprises a disc drive with five discs (instead often in a half-high drive) so that the stack height is 11.37 mm (0.4475 inches), instead of 24.6 mm in a half-high drive, and the overall or profile height with the cover in place is 25.4 mm (1.00 inches), instead of 41.15 mm in a half-high drive. Also, since there are only five discs, ten load arms mounted to six actuator arms of the E-block are employed, instead of twenty and eleven in the case of the half-high drive. Otherwise, the construction is the same. The low-profile and half-high drives enjoy the same footprint, and the same size and style of recording discs, and essentially the same seek time. However, because there are half as many discs in a low-profile drive, the total data capacity is also half that of a half-high drive. Hence, the low-profile drive has a capacity of about 9 gigabytes, compared to 18 gigabytes of the half-high drive.

There are several problems with the disc drive illustrated in FIGS. 1 and 2. Due to the volume requirements of the various components of the drive, there is no real estate available for future electronic or mechanical features to improve the disc drive. Moreover, the drive is limited in access time and speed of recovery. More particularly, the actuator assembly illustrated in FIG. 1 has a length of 52 mm (2.05 inches) from axis of 48 to the transducing gap of head 44. The actuator arm illustrated in FIG. 1 typically requires an inertia of 116 gram-cm$^2$ (18 gram-inch$^2$). Track seeks, which is the movement of the head from a current track to a desired destination track, requires an average of 7.7 milliseconds (msec). Moreover, once reaching the destination track, there is a latency associated with the disc drive because the disc must rotate to a position where the head may read a header or other informational portion of the track before the head is readied for transducing with the track. During the seek movement and latency, it is not possible to read data from, or write data to, the disc tracks.

The present invention is directed to an improved disc drive requiring less inertia for the actuator arm and a shorter average seek time without sacrificing drive capacity or the form factor of the disc housing, or significantly increasing power requirements of the spindle motor. The disc drive of the present invention requires less power to rotate a disc at a given speed. One form of the disc drive of the present invention achieves higher disc rotational velocities without significantly increasing power requirements of the spindle motor. Hence, the operating temperature of the drive is not increased. Since higher operating temperatures of a disc drive accelerates disc drive failure, the present invention achieves improved performance without increasing failure due to temperature.

Figure 3:
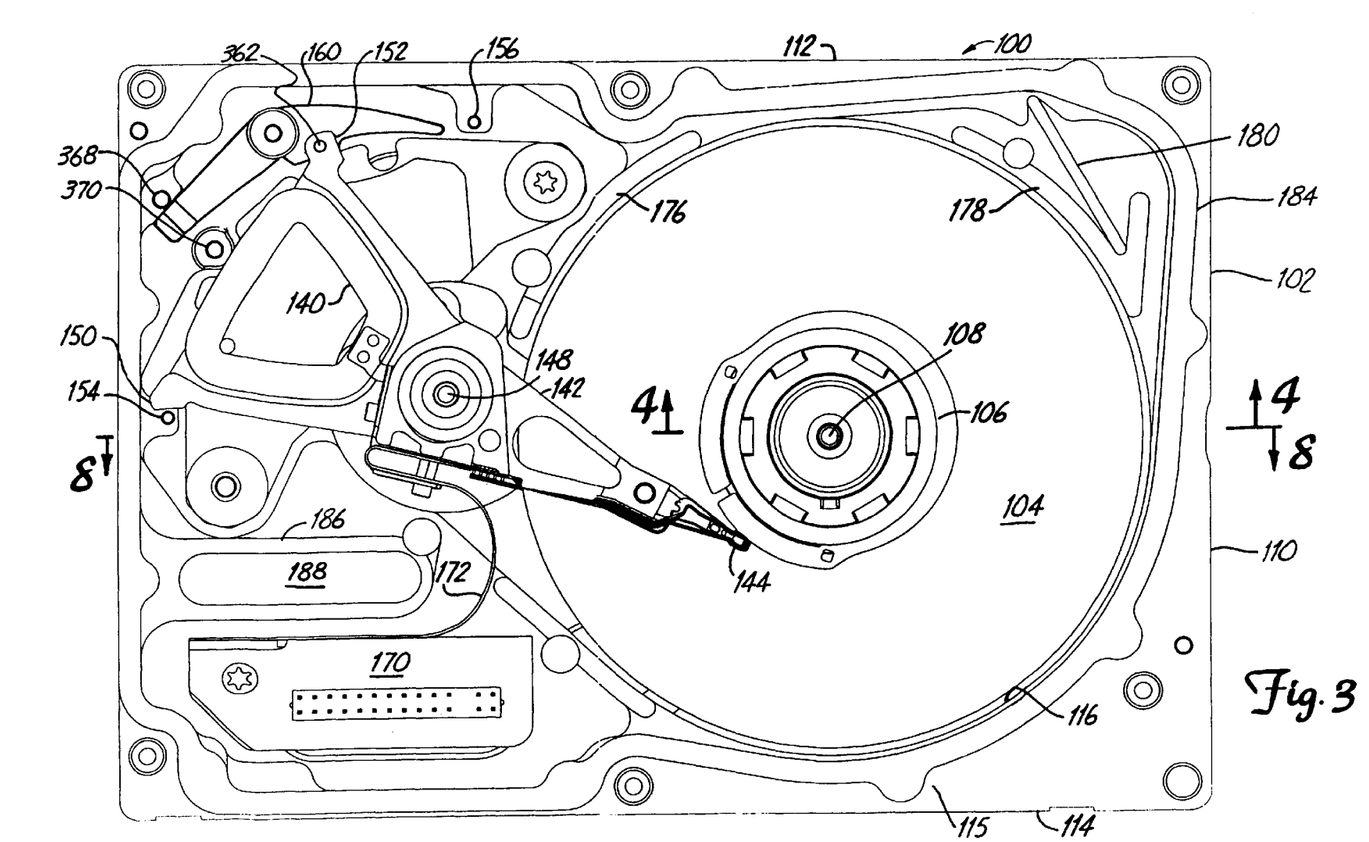
FIG. 3 is a top plan view of a magnetic disc drive, with the top cover removed, in accordance with the present invention.
Figure 4:
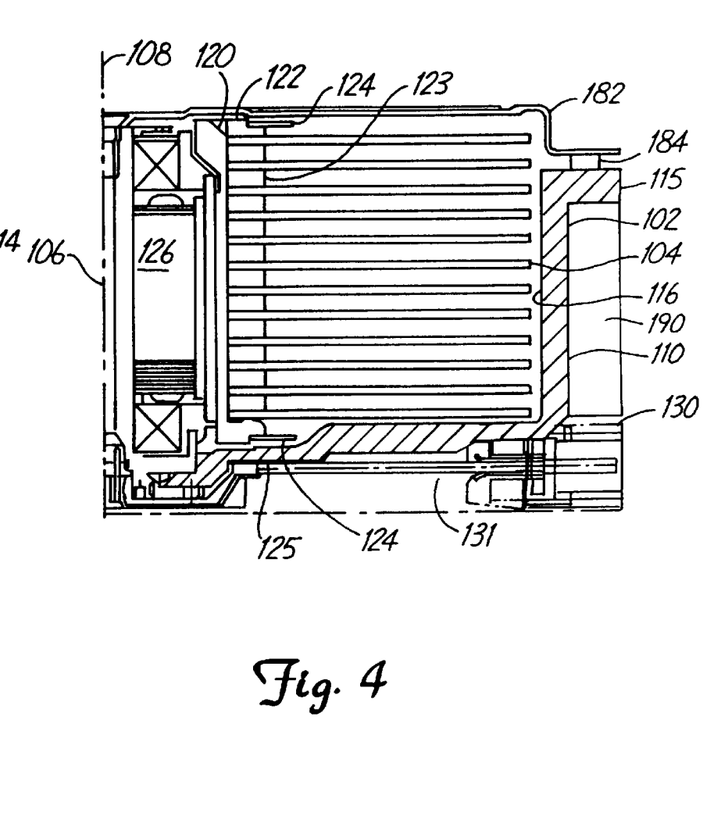
FIG. 4 is a partial section view of the disc stack and spindle assembly of the disc drive illustrated in FIG. 3, taken at line 4—4 in FIG. 3.
Figure 5:
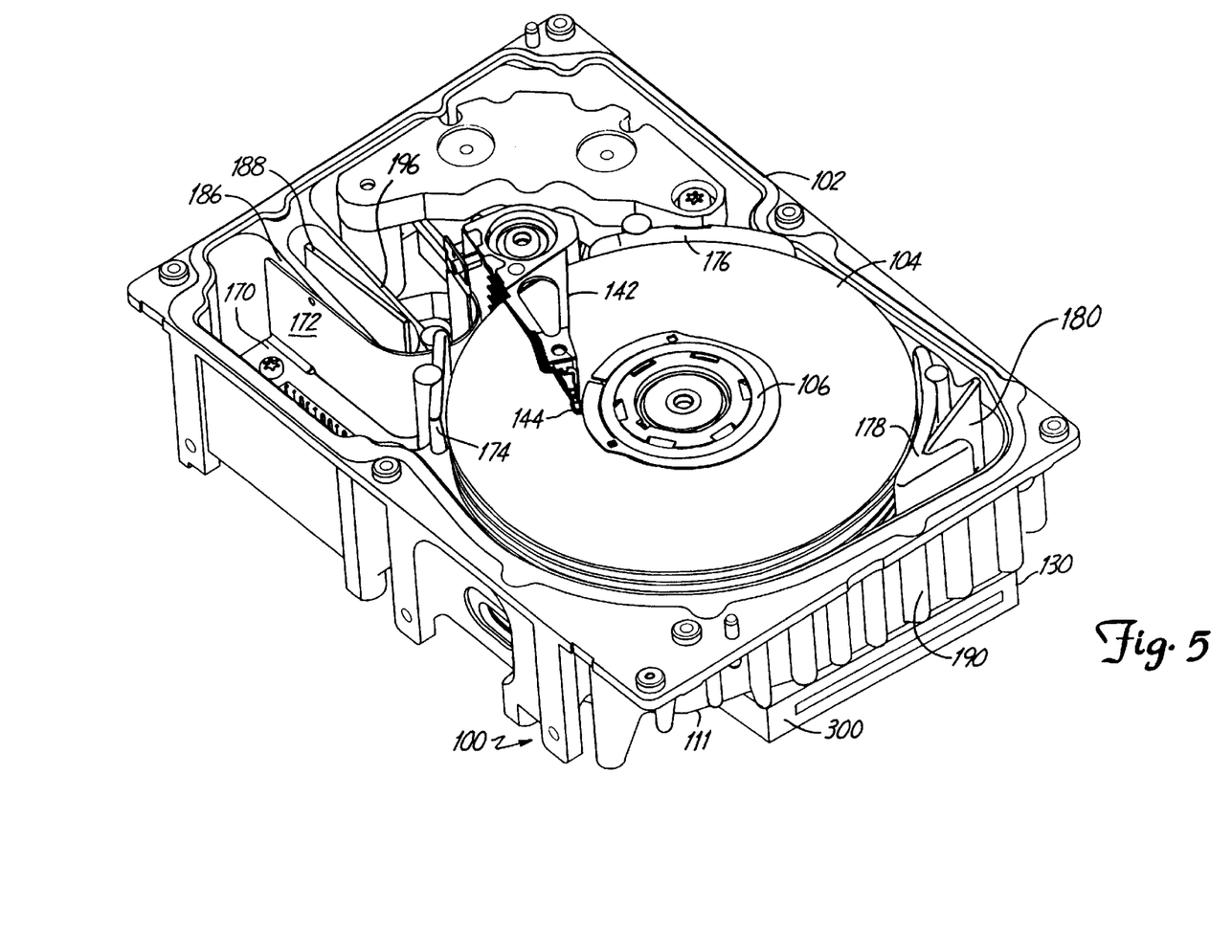
FIG. 5 is a frontal and top perspective view of the disc drive illustrated in FIGS. 3 and 4, with the top cover removed.
Figure 6:
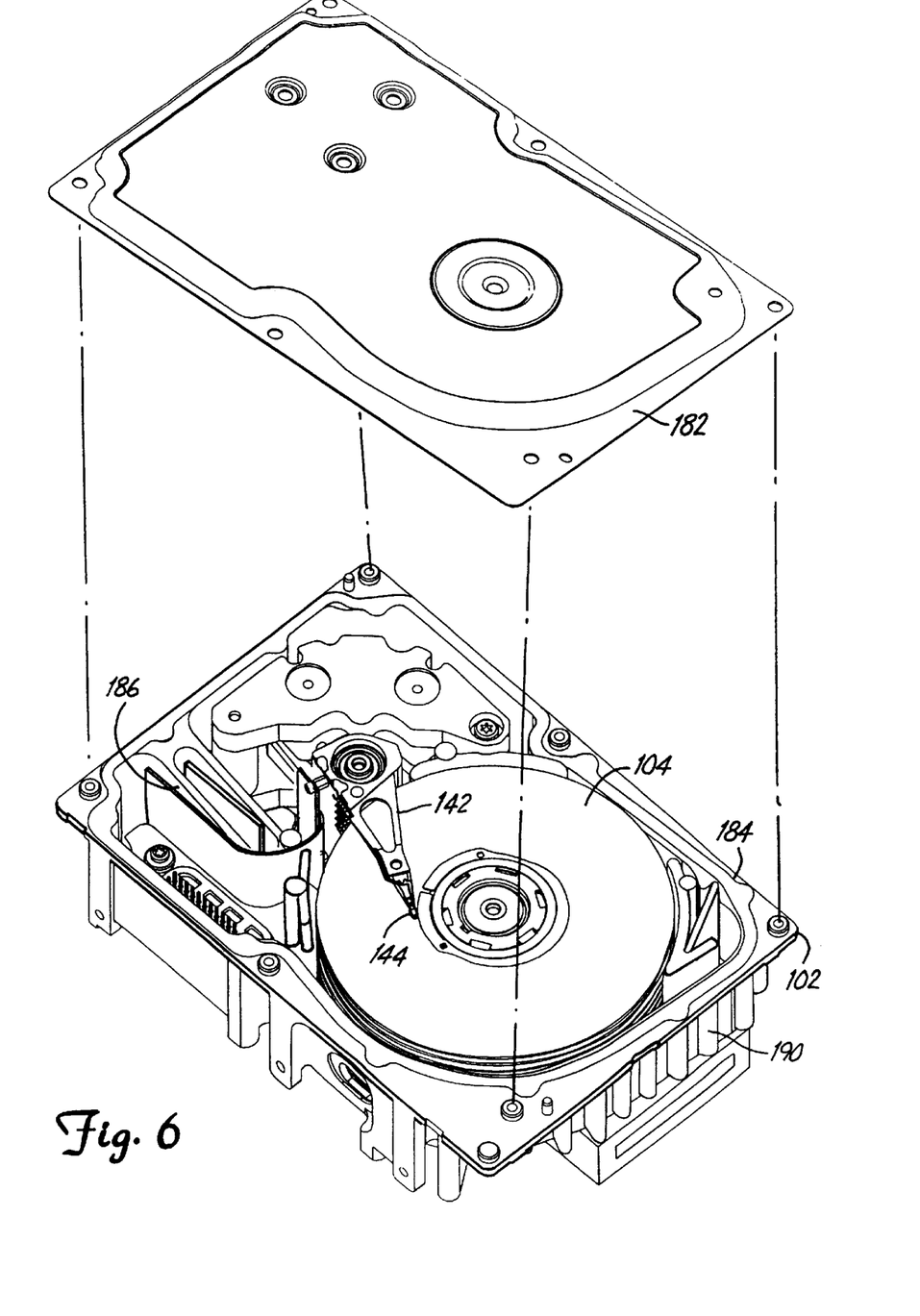
FIG. 6 is an exploded perspective view, as in FIG. 5, of the disc drive illustrated in FIGS. 3 and 4 and its top cover.
Figure 7:
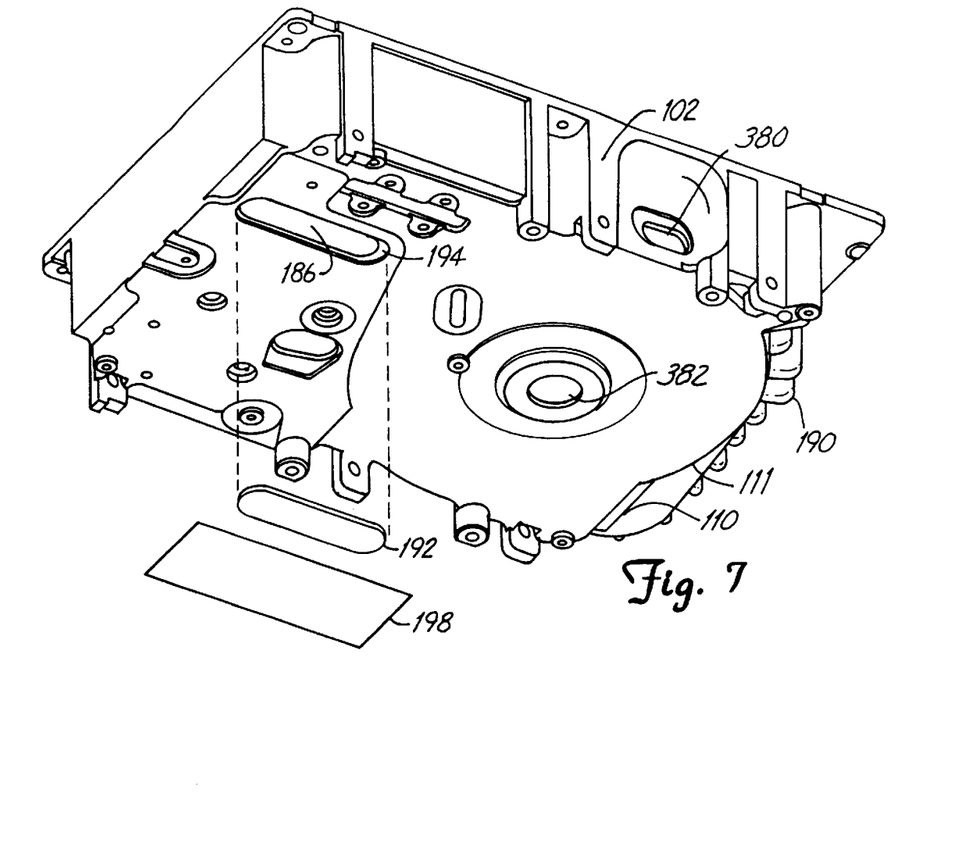
FIG. 7 is a perspective bottom view of the disc drive housing illustrated in FIGS. 3 and 4 illustrating the assembly of the bottom seal to the housing.
Figure 8:
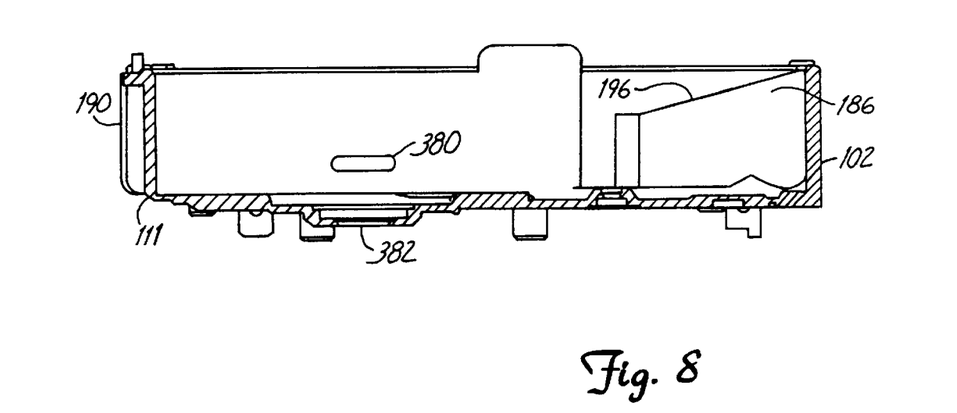
FIG. 8 is a section view of the disc drive housing taken at line 8—8 in FIG. 3.

FIGS. 3 and 4 illustrate a top view and section view of a disc drive 100 in accordance with one embodiment of the present invention. FIG. 5 is a perspective view of disc drive 100, FIG. 6 is an exploded top perspective view of disc drive 100, FIG. 7 is an exploded bottom perspective view of the disc drive housing for disc drive 100, and FIG. 8 is a section view of the disc drive housing taken at line 8—8 in FIG. 3. For sake of comparison, the disc drive illustrated in FIGS. 3, 4 and 5–8 will be described in comparison to the 3½ inch half-high standard disc drive illustrated in FIGS. 1 and 2, but it is understood that the principles of the present invention are applicable to other standard disc drive forms, including 2½ inch and 5¼ inch drive forms and other heights, including low-profile.

Disc drive 100 includes a housing 102 having a standard footprint that is 101.6 mm (4.0 inches wide) and 146 mm (5.75 inches) long and identical to the footprint of the disc drive illustrated in FIGS. 1 and 2. A stack of twelve discs 104 are mounted to a disc spindle 106 centered on an axis 108 that is located 50.8 mm (2.0 inches) from one short side 110 and both long sides 112 and 114 of housing 102. Discs 104 have a diameter of 84 millimeters (about 3.3 inches) and are stacked on spindle 106 within a cylindrical receiver portion of housing 102 defined by inner cylindrical surface 116. Surface 116 has a radius of approximately 43.2 mm (1.7 inches), centered on axis 108. It will be appreciated that walls 110, 112 and 114 form a lip 115 at the top of housing 102, and that the thinnest portion of lip 115 (where surface 116 is closest to the external sides 110, 112 and 114), is about 7.6 mm (0.3 inches), as compared to 2.5 mm in the drive illustrated in FIGS. 1 and 2. Moreover, wall 110 includes heat fins 190 (FIG. 5), and the bottom edge of wall 110 includes a curved outline following the curve of the discs.

As shown particularly in FIG. 4, the stack of discs comprises twelve concentric discs 104 mounted to an aluminum hub 120 by clamp ring 122. Balance shims 124 positioned on clamp ring 122 and the lower portion of hub 120 provide balance to the stack of discs to prevent wobble as the discs spin. Each disc 104 has a thickness of approximately 0.8 mm (0.0315 inch) and spacers 123 between the discs space the discs from each other by approximately 1.75 mm (0.069 inch). Consequently, the stack height of a fill stack of twelve discs is approximately 28.88 mm (1.137 inch). Motor 126 is mounted to spindle 106 to rotate discs 104 at a design speed of 10,000 rpm.

Figure 9:
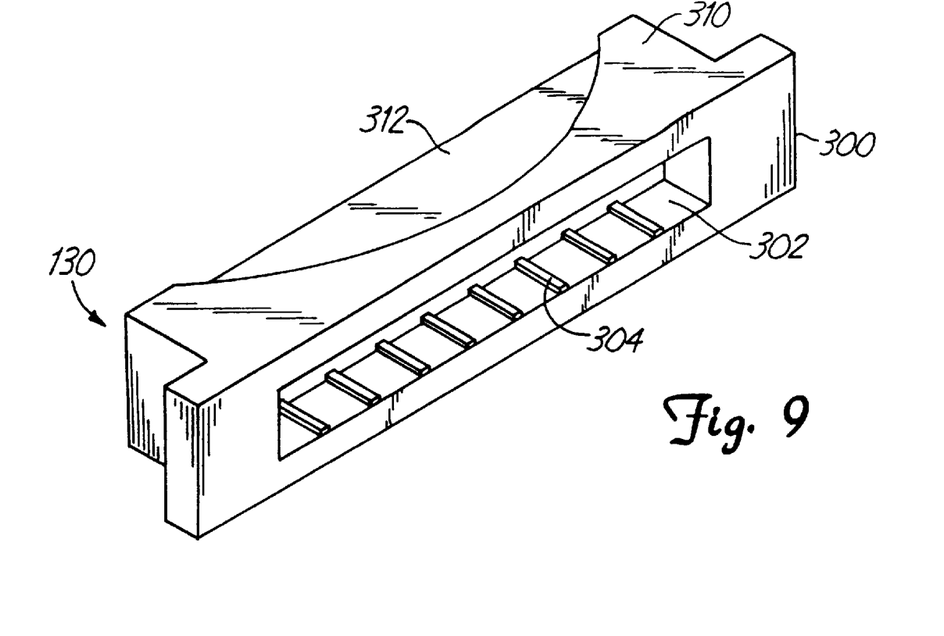
FIGS. 9 and 10 are perspective views of opposite sides of a connector employed in the disc drive illustrated in FIGS. 3 and 4.
Figure 10:
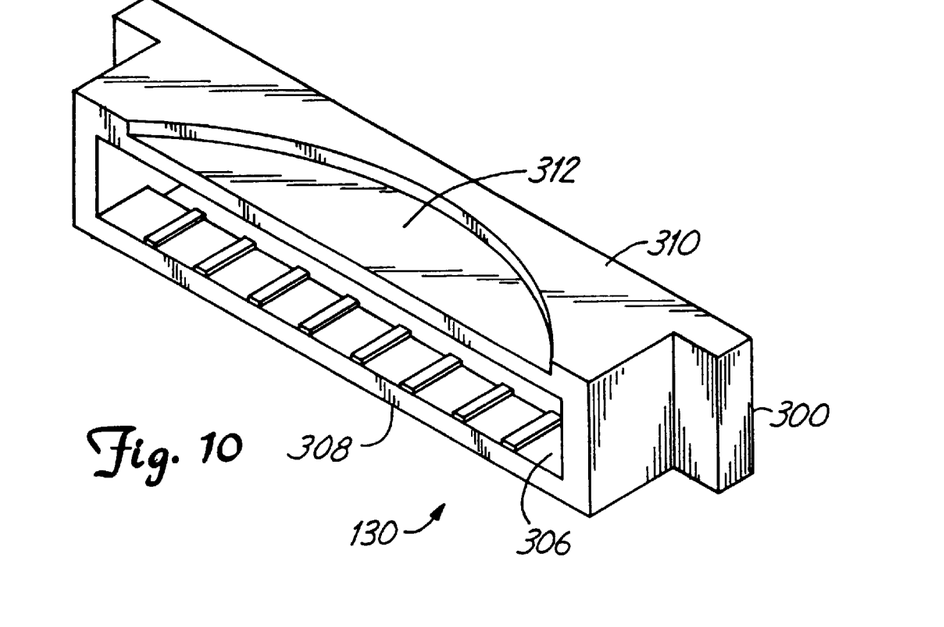

Input/output connector 130 connects external circuitry (not shown) to circuit board 131 mounted under the underportion of housing 102. Connector 130 is illustrated in greater detail in FIGS. 5, 9 and 10. Like connector 34 shown in FIG. 2, connector 130 requires more space at the edges of the housing than board 131 requires centrally. Connector 130 includes a housing 300 having an opening 302 for receiving an industry standard male plug connector (not shown) from a cable (not shown) connected to circuitry (not shown) external to the disc drive. Contacts 304 within opening 302 are arranged to mate with contacts (not shown) on the plug connector. Opening 306 receives an edge of circuit board 131 (FIG. 4) and includes contacts 308 arranged to engage corresponding contacts on board 131. The upper surface 310 of housing 300 includes an arcuate recess 312 having the same configuration as the curved bottom edge 111 (FIG. 7) of wall 110 of housing 102. Connector 130 does not interfere with the space required for discs 104 due to the smaller radius of discs 104 as compared to that of discs 12 of the prior art and recess 312 receiving the bottom edge of wall 110 of housing 102. Consequently, the lowermost disc 104 closest to the lower wall of housing 102 is closer to the lower wall of the housing than is the lowermost disc of the stack of discs 12 shown in FIG. 2. As in the prior art, connector 130 provides power and control inputs for motor 126 as well as signal and power inputs and outputs for other portions of the disc drive to be described.

As shown particularly in FIG. 4, the thickness of the bottom wall 125 of housing 102 is thinner than that of prior art housing 10. More particularly, the thickness of the bottom wall 125 is about 3.25 mm (0.124 inches), compared to about 3.81 mm (0.150 inches) at bottom wall 31 in housing 10. Surface 116 forms a reduced receiver portion within housing 102 to receive the smaller discs. This reduced receiver portion offsets any reduction in axial stiffness of housing 102 due to the reduced thickness of wall 125. Additionally, the thicker walls 110, 112 and 114 as described above, and the structural support provided by desiccant housing 186 described below, provide additional structural support for housing 102.

Also as shown in FIG. 4, clamp ring 122 is axially thinner, but radially wider, than clamp ring 28 shown in FIG. 2. More particularly, the radial width of clamp ring 122 is approximately equal to the radial width of spacers 123 to compensate for the smaller axial thickness of the clamp ring to thereby control hoop stress in the clamp ring. The radial extent of spacers 123 define the position of the innermost track on discs 104. The reduced thickness of wall 125 (compared to wall 31), thinner clamp ring 122 (compared to clamp ring 28), thinner spacers 123 (compared to spacers 33) and closer positioning of the disc stack to the lower wall of the housing permit the twelve discs of disc drive 100 to fit into the same vertical dimension as the ten discs of the disc drive according to the prior art. Hence, the disc drive shown in FIG. 4 has a height of 41.15 mm (1.62 inches), the same as the disc drive shown in FIG. 2. The structural integrity of clamp ring 122 is not affected because its extended radial width offsets its thinner axial thickness. Moreover, the position of the innermost radial track on the recording disc is not affected by the wider clamp ring because the clamp ring extends no further from spindle axis 108 than do spacer rings 123.

Printed circuits (not shown) are formed in housing 102 on a bottom surface to provide connection to voice coil motor 140 (FIG. 3) for E-block 142, as well as data paths to bulkhead connector 170 mounted to the bottom wall of housing 102. Flex circuit 172 is connected to connector 170 and to conductors 214 (FIG. 13) on E-block 142 to provide signals to heads 144 mounted to each load arm 146 at the end of the actuator arms of E-block 142. Flex circuit 172 also carries voice coil signals for motor 140.

As is well known in the art, there is a separate load arm 146 and gimbal/slider/head 144 for each of the twenty-four disc surfaces of the twelve discs 104. The twenty-four load arms 146 are mounted to thirteen actuator arms of the E-block for rotation about axis 148 under the influence of voice coil motor 140. A pair of stop arms 150 and 152 are formed from the yoke of motor 140 to react against stop pins 154 and 156 mounted to housing 102 to define the limit of rotational travel of E-block 142, thereby defining the inner and outer tracks on discs 104. The engagement of stop arm 150 to stop pin 154 defines an inner stop position that limits the inner rotational travel of E-block 142 about the axis 148, thereby defining the inner track of the discs. The engagement of stop arm 152 to stop pin 156 defines an outer stop position that limits the outer rotational travel of E-block 142 about the axis 148, thereby defining the outer track of the discs.

As in the prior art 3½ inch disc drive, the inner track radius of the disc drive shown in FIGS. 3 and 4 is 20.4 mm, but the outer track radius is 40.2 mm (1.583 inches) from spindle axis 108 of discs 104, rather than 45.7 mm as in the prior art. Conveniently, a latch mechanism 160 is mounted to housing 102 to engage stop pin 362 on arm 152 when the actuator assembly is in a rest or shipping position at an inner track of discs 104. Latch mechanism 160 is illustrated particularly in FIG. 3 and in detail in FIG. 11, and includes a housing 350 formed of rigid plastic mounted to a pin or bearing 352 mounted to the disc drive housing and arranged to pivot about the axis of pin 352 in the direction of arrows 354. Housing 350 includes a first arm 356 having a detent 358 and lip 360 arranged to engage pin 362 on stop arm 152. Housing also includes a second arm 364 having a small permanent magnet 366 having north and south poles 367' and 367". Pins 368 and 370 are constructed of magnetic metal, such as magnetic stainless steel, and are rigidly mounted to the disc drive housing to define a limit to the rotation of housing 350 about the axis of pin 352 and to hold housing 350 at one of its limit positions by magnetic force of magnet 366. When voice coil 140 operates to move E-block 142 to an innermost track position, pin 362 engages lip 360 to rotate latch housing to the position illustrated in FIGS. 3 and 11 to retain pin 362 mounted to stop arm 152 in detent 358. Magnet 366 engages pin 368 to prevent rotation of housing 350 due to physical shock. Hence, during transportation of the disc drive, magnet 366 and pin 368 retain the position of housing 350 to prevent rotation of E-block 142. To disengage pin 362 from detent 358, current applied to voice coil motor 140 provides sufficient force so that pin 362 reacts against detent 358 to rotate housing 350 about its axis, so that magnet 366 is attracted to pin 370 to move housing 350 to its unlatch position, opposite that shown in FIGS. 3 and 11.

The latch mechanism 56 of the prior 3½ inch disc drive shown in FIG. 1 was placed beside the actuator arm, near the space occupied by flex cable 42 for bending as the actuator arm rotated between its limit positions. The smaller disc diameter of the present invention, coupled with the shorter length of the actuator arm, permits the axis 148 of E-block 142 to be placed closer to axis 108 of the disc spindle than in prior disc drives. As a result, latch mechanism 160 may be placed behind voice coil 140 from E-block 142 (FIG. 4) without sacrificing the active length of the voice coil, thereby gaining improved access to the actuator assembly for connection of flex cable 172 to the actuator. Moreover, space within the drive is available to add future improvements in the actuator assembly thereby improving the disc drive.

The disc drive illustrated in FIGS. 3 and 4 has a track density of 9000 tracks per radial inch (354.3 tracks per radial mm) of each disc. With twelve discs as described, the disc drive illustrated in FIGS. 3 and 4 has a data capacity of about 18 gigabytes.

Baffles 174, 176 and 178 are employed about the outer periphery of the discs to channel air movement and reduce drag on the discs. Filter 180 may be employed to filter contaminants from the air. An aperture 380 (FIGS. 7 and 8) is provided in a wall of housing 102 to permit the clock write head to access the servo track of the disc drive, and bottom aperture 382 (FIGS. 7 and 8) provides a seat for disc spindle 106 and its associated bearings; aperture 382 being sealed by a gasket and insertion of the disc spindle to the housing.

A stainless steel cover 182 (FIGS. 4 and 6) is fastened to the top surface of housing 102 with a gasket 184 to seal the chamber of the housing and protect the disc drive from contaminants that might otherwise enter the drive. The top cover is fastened to housing 102 by threaded fasteners (not shown). A bottom cover 192 (FIG. 7) is fastened to the bottom wall of housing 102 to close a desiccant chamber. Bottom cover 192 comprises a metal plate assembled into the opening 194 in the bottom wall and held in place and sealed by adhesive tape 198. With the covers in place, the overall height of the disc drive is 41.15 mm (1.62 inches).

In the prior art, the desiccant member 68 (FIG. 1) was positioned in housing 10 between bulkhead connector 40 and the inside surface of side wall 22. It was necessary to insert the desiccant package 68 prior to sealing the drive. The desiccant package was then exposed to the relatively humid ambient conditions for a considerable amount of time during servo track writing and other testing before sealing the drive. The present invention employs a desiccant housing 186 that permits placement of desiccant 188 into the housing immediately before closing and sealing the disc drive, so the desiccant is exposed to humid air outside the drive for a minimal period of time.

FIG. 7 is an exploded bottom view of the disc drive housing 102 and bottom cover 192, and FIG. 8 is a section view of the housing 102 (without covers) taken at line 8—8 in FIG. 3. As shown in FIG. 7, a desiccant housing 186 is integral with the bottom wall of housing 102. Desiccant housing 186 has side walls that define a length and width to a desiccant chamber containing desiccant pack 188. One of the width side walls of desiccant housing 186 is common to one of the width side walls of disc drive housing 102 so that the desiccant housing is oriented lengthwise within the disc drive housing with the walls defining the length of the desiccant housing being substantially parallel to the walls defining the length of housing 102. Desiccant housing 186, being integral with the bottom wall of housing 102, forms a structural beam for the bottom wall of housing 102 to provide additional structural strength for the housing. Desiccant housing 186 forms an opening 194 in the bottom wall of housing 102 and is closed and sealed by bottom cover 192, assembled into opening 194 and held in place and sealed with flexible adhesive tape. Desiccant pack 188 is inserted into the housing 186 immediately prior to fastening the bottom cover 192 to the housing to maintain the humidity within the disc drive to a design level. As shown in FIG. 8, the top edge 196 of desiccant housing 186 is in a plane that is sloped from the common wall with housing 102 and downwardly toward the bottom wall or deck of housing 102 to form a sloped opening between the desiccant chamber within housing 186 and the disc drive components in the chamber enclosed within housing 102 and the top and bottom covers. The sloped opening permits good air circulation between the disc drive chamber and the desiccant in housing 186 to maintain the humidity within the disc drive chamber at a design level. Conveniently, the angle of the plane of sloped opening 196 is between about 20° and 25° from the plane of the bottom surface.

During assembly, the components of the disc drive are assembled by access into the disc drive chamber through the top opening of housing 102. Upon completion of the assembly, the top cover is attached and sealed to disc drive housing 102. Desiccant pack 188 is then placed within housing 186 which is then closed and sealed with bottom cover 192 and flexible tape, as described above. Since the desiccant is exposed to the atmosphere for a minimal period of time during final assembly, damage to the desiccant due to atmospheric conditions is minimized. As a result, the desiccant is able to immediately adjust the enclosed atmosphere of the disc drive chamber to the design humidity.

As described above, the bottom wall of housing is thinner than in the prior art drive. The thinner housing walls are adequate because of the smaller opening required for the discs. Moreover, the orientation of desiccant housing 186 along the long dimension of housing 102 more centrally from the side walls permits the desiccant housing to form a strengthening member for the housing. The orientation of desiccant housing 186 longitudinally within the disc drive housing provides structural support for the disc drive housing and overcomes any structural loss due to the thinner housing walls. The 20° and 25° angle to the slope of the top of desiccant housing 186 does not detract from the strengthening effect to housing 102 provided by the desiccant housing.

Lip 115 provides a minimum of 7.6 mm on which to seat gasket 184 to seal the disc drive with cover 182. The prior art drive provided a seat dimension of 2.5 mm at the minimum location, which often resulted in the gasket misseating against the housing and cover so that the drive was not properly sealed and contaminants could enter the drive.

The footprint of the drive is 101.6 mm by 146 mm, as in the prior art. However, only about 91.4 mm (3.6 inches) of the width of the drive is required for the drive components. As shown in FIGS. 5 and 6, the 10.2 mm (0.4 inches) savings permits the addition of heat fins 190, extending as much as 5.1 mm (0.2 inches) into the space surrounding the disc cavity to increase the surface area of housing 102 to further dissipate heat from the drive.

A "low-profile" version of the disc drive illustrated in FIG. 3 and 4 comprises a disc drive with six discs (instead of twelve in a half-high drive) so that the stack height is 13.56 mm (0.534 inches), instead of 11.37 mm stack height of low-profile drives of the prior art and 28.88 mm stack height of half-high drives according to the present invention. The overall or profile height of the low-profile disc drive of the present invention, with the cover in place, is 25.4 mm (1.00 inches), instead of 41.15 mm in a half-high drive, and is the same as in the prior art low-profile drive of FIGS. 1 and 2. As in the prior art, the low-profile and half-high versions of the drives according to the present invention enjoy the same foot print, size and style of recording discs and essentially the same actuator arm seek times. However, because there are half as many discs in a low-profile drive, the total data capacity is also half that of a half-high drive. Hence, the low-profile drive has a capacity of about 9 gigabytes, compared to 18 gigabytes of the half-high drive.

The actuator assembly comprising E-block 142, load arm 146, head/slider 144, voice coil 140 and stop arms 150 and 152 are smaller than the corresponding actuator assembly of the prior art. More particularly, the actuator assembly shown in FIG. 3 has a length of 45.7 mm (1.8 inches) from axis of 148 to the transducing gap of head 144 and has a shorter overall stroke between the inner and outer tracks. Consequently, the average stroke of the actuator assembly is smaller than in the prior drive. As a result, the actuator arm requires a smaller inertia of 67.7 gram-cm$^2$ (10.5 gram-inch$^2$), and track seeks of the drive illustrated in FIGS. 3 and 4 require an average of 5.7 msec, 2 msec faster than the prior art drive illustrated in FIGS. 1 and 2.

Non-repeatable runout is the condition of unpredictable movement between the head and the disc causing tracking errors. The movement may be caused by a variety of factors, including bearing vibration, actuator vibration and wind turbulence. It is known, for example, that windage between the discs causes turbulence and air pressure variations from the inner radius to the outer radius. Pressure variations between the discs causes the discs to "flutter", adversely affecting track positioning and adversely affecting non-repeatable runout. By reducing the diameter of the discs over the standard discs previously employed, and by reducing the spacing between the discs over the disc spacing previously employed, windage and pressure variations are reduced, resulting in thereby improving the non-repeatable runout characteristics of the disc drive of the present invention over those of the prior art. Table I illustrates the improved non-repeatable runout achieved by a 3½ inch disc drive (84 mm disc) of the present invention over 3½ inch disc drives (95 mm disc) of the prior art, both operating at the same rotational velocity.

TABLE I

| Disc (dia) | Runout at 20.4 mm | Runout at 40.2 mm | Runout at 45.7 mm |
| --- | --- | --- | --- |
| 95 mm (3-Σ) | 0.245 microns | 0.309 microns | 0.335 microns |
| 84 mm (3-Σ) | 0.193 microns | 0.206 microns | |
| 95 mm (w/c) | 0.361 microns | 0.502 microns | 0.554 microns |
| 84 mm (w/c) | 0.283 microns | 0.335 microns | |

Table I compares the runout of 3½ inch disc drives having standard 95 mm discs to 3½ inch disc drives according to the present invention having an 84 mm disc. Illustrated are the measured runout at the inner data track (20.4 mm), at 40.2 mm inch radius (which is the outer data track for the 84 mm discs) and at 45.7 mm radius (which is the outer data track for the 95 mm discs). One set of data is runout data for the disc drives in accordance with the 3-sigma (3-Σ) standard deviation, and the other set of data reflects the worst case (w/c) runout for the disc drives. It will be appreciated that the disc drive according to the present invention exhibits non-repeatable runout that is between 0.052 and 0.078 microns improvement over the prior art drives at the inner data track and between 0.103 and 0.167 microns improvement at the 40.2 mm inch radial position (which is the outer data track of the 84 mm discs, but somewhat inboard of the outer data track on the 95 mm discs). This represents non-repeatable runout performance improvements of between 21% and 33%.

As shown in FIG. 3, stop arms 150 and 152 engage a stop pin 154 or 156 to define the stop positions that limit of rotational travel of E-block 142. As shown particularly in FIGS. 12 and 14, stop arms 150 and 152 have flat surfaces 151 and 153, respectively to engage stop pins 154 or 156. One feature of the invention resides in the ability to accurately locate and position the inner and outer tracks of discs 104. More particularly, E-block 142 is placed in a shuttle (not shown). The gimbal/slider head assembly 146, 144 is swagged to the E-block and the position of the transducing gap or element of head 144 is located with respect to the shuttle and to axis 148 of the actuator assembly. The distance between axis 148 and transducer is represented by distance 250. The distance between the innermost and outermost data tracks being known (e.g., 19.8 mm in the present invention), the total angular displacement of the E-block can be geometrically identified. Likewise, the distance 252 between axis 148 and the arc 254 of movement of stop surfaces 151 and 153 is also known from the geometry of the E-block. Consequently, the positions of surfaces 151 and 153 may be milled or otherwise adjusted to accurately position the angular travel of head 144 in the full extent of movement of the E-block. The milling of surfaces 151 and 153 is performed in planes that project through axis 148 so that surfaces 151 and 153 are normal to the arc of travel of the yoke arm as the E-block rotates about the axis. Therefore, upon completion of the assembly of the E-block into the disc drive, the position of the inner and outer tracks is accurately determined.

One feature of the stop assembly resides in the fact that the stop surfaces are on the yoke arms of the motor assembly for the E-block, distal from the spindle axis and arranged to engage a stop pin 154, 156 mounted to the disc drive housing. In the prior art drive, stop pin on the E-block was mounted to an extension arm adjacent the flex circuit and near the spindle axis to engage a surface of the housing. Because of the proximity of the stop arrangement to the E-block, any error in positioning the stop surfaces was magnified along the greater distance (for example, 250) of the actuator arm to the head. More particularly, the distance between the spindle axis and transducer was typically three times the distance between the spindle axis and the stop surface, so any error in positioning the stop surface was magnified up to three times to the head. By positioning the stop surface at the distal end of the yoke as in the present invention, coupled with the shorter actuator arm of the E-block due to the smaller recording discs, the distance between the head 144 and the spindle axis 148 is nearly the same as the distance between axis 148 and stop surfaces 151 and 153. As a result, any error in the positioning of stop surfaces 151 and 153 is not magnified to the head as in the prior art.

One feature of the disc drive of the present invention resides in the access to flex circuit 172 and E-block 142 to permit connection of the flex circuit to conductors supported by the E-block for the heads. This feature is particularly illustrated in FIGS. 12–15.

Figures 11, 12:
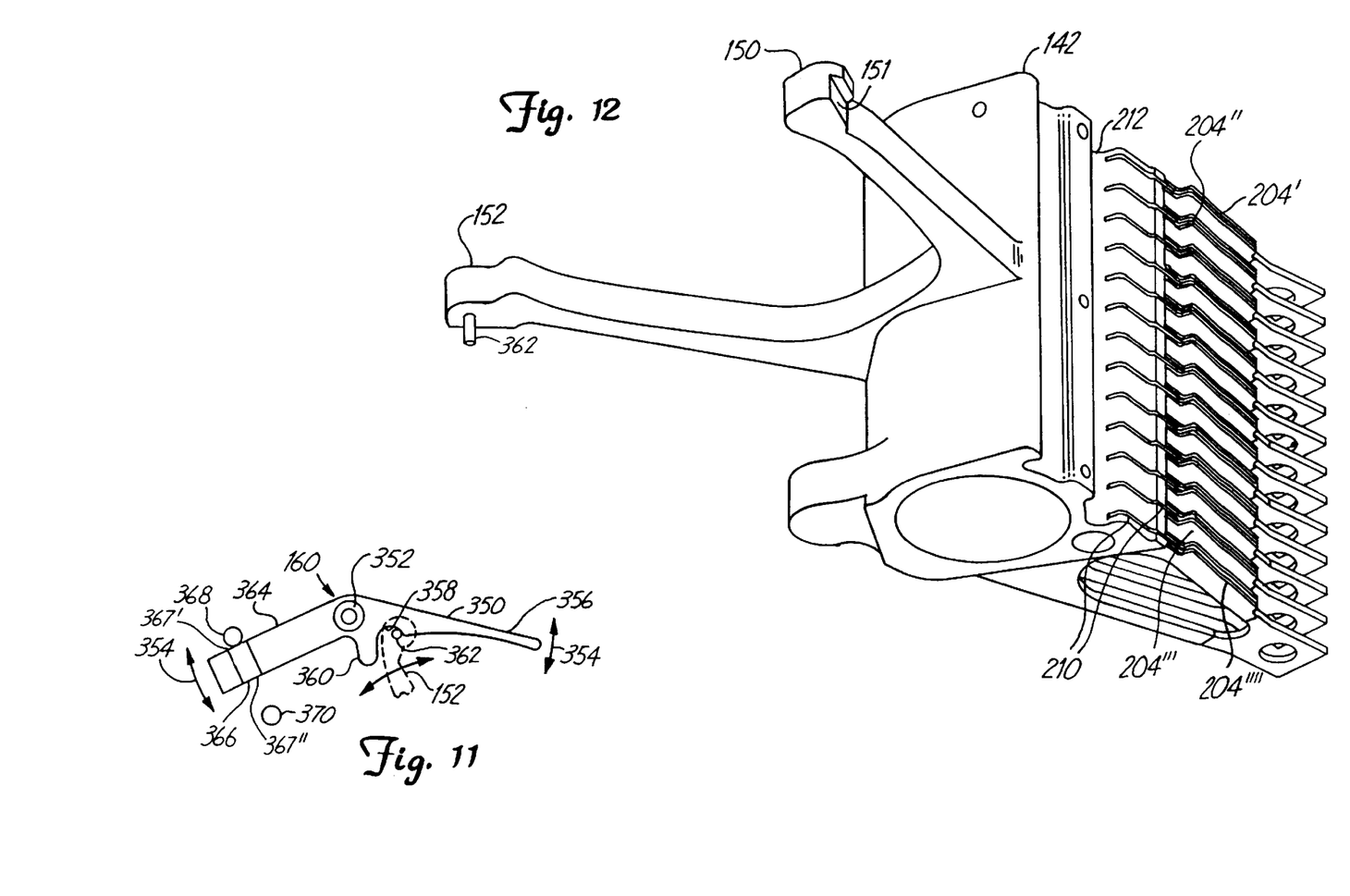
FIG. 11 is a plan view of a latch mechanism employed in the disc drive illustrated in FIGS. 3 and 4.
FIG. 12 is a perspective view of a portion of an actuator assembly of the disc drive illustrated in FIGS. 3 and 4.

FIG. 12 illustrates a portion of the actuator assembly of the present invention. The actuator assembly includes E-block 142 having a plurality of actuator arms 204'. . . 204''''. For the twelve discs of the disc drive illustrated in FIGS. 3 and 4, there are thirteen actuator arms 204 of E-block 142. Actuator arms 204' and 204'''' carry a single load arm 146 and head 144 (FIG. 3), whereas actuator arms 204''. . . 204''' each carry two load arms 146 and heads 144. Each disc spins between two actuator arms, load arms and gimbal/slider/head arrangements so that a single head confronts each disc surface. As shown in FIG. 12, actuator E-block 142 includes a plurality of thirteen slots 210 extending between an axial slot 212 and actuator arms 204.

Figure 13:
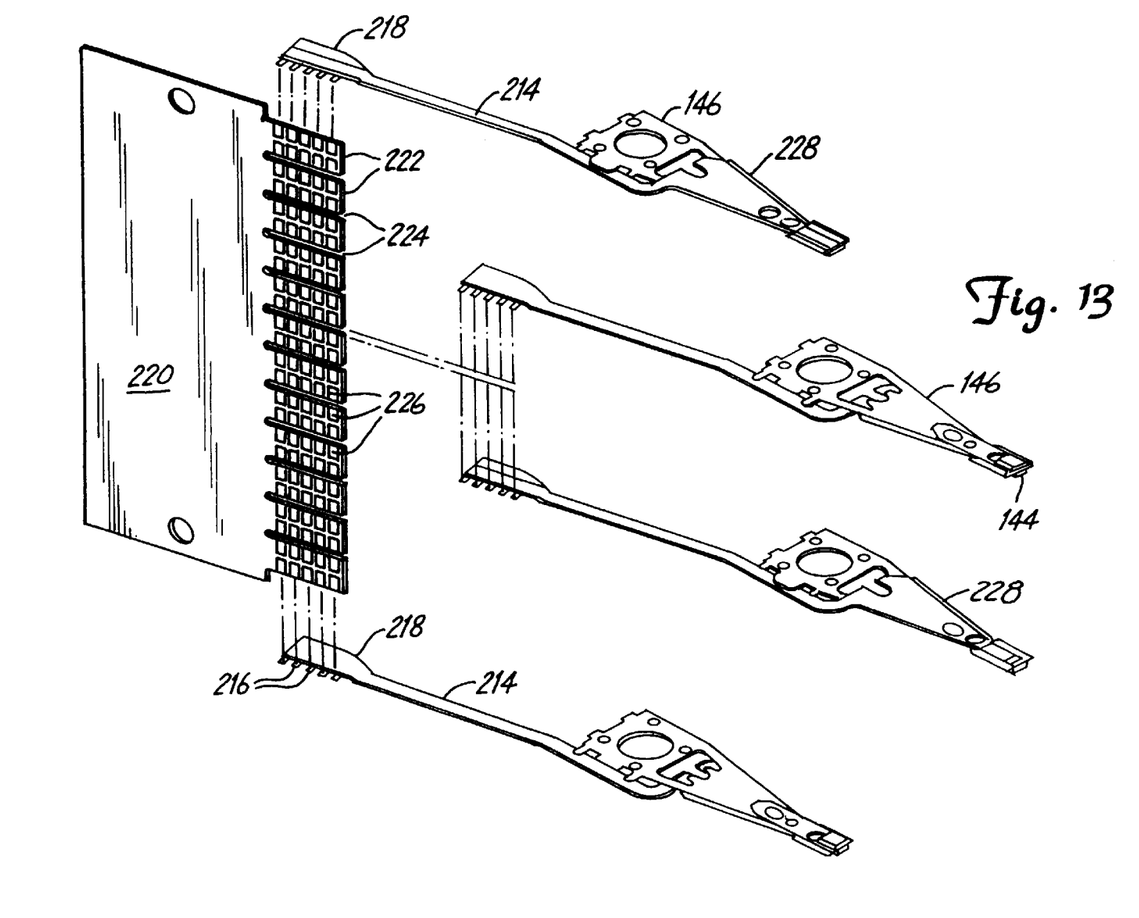
FIG. 13 is an exploded perspective view illustrating connection of conductors between a flex circuit and transducing heads supported on load arm/gimbal assemblies of the actuator assembly illustrated in FIG. 12.

FIG. 13 illustrates a plurality of load arms 146 terminating at heads 144 on sliders. A ribbon of conductors 214 extends from heads 144 and terminates at tabs 216. The ribbon 214 comprises a suitable insulator material, such as Kapton encapsulating printed copper traces that provide electrical connection between tabs 216 and heads 144. For flexibility, ribbon 214 is preferably about 2 to 3 mils thick. Tabs 216 on each ribbon form conductive terminations for the copper traces on the ribbon. Tabs 216 project outwardly from ribbon 214 opposite a fin 218. Each fin 218 is constructed of Kapton and copper traces, and has a thickness that may be equal to the thickness of ribbon 214. Ribbons 214 further include terminations 228 that distribute electrical connections from the ribbon portion to heads 144. Each termination 228 is adhesively attached to one side of a respective load arm 146 on a side of the load arm opposite head/slider 144. With load arms 146 mounted to actuator arms 204 and terminations 228 attached to the load arms, ribbons 214 extend along the length of the actuator arms along one side thereof. Ribbons 214 and fins 218 are located in slots 210 in E-block 142 (FIG. 12). In the case of actuator arms 204' and 204'''', slot 210 is wide enough to accommodate a single ribbon and fin assembly, whereas the slots for actuator aims 204''–204''' are wide enough to accommodate two ribbon and fin assemblies for the two head supported by the arm.

Substrate 220 (FIG. 13) is mounted to E-block 142 and includes a plurality of extensions 222 forming slots 224 therebetween, matching slots 210 on E-block 142 at the position of tabs 216, except there is no slot 224 corresponding to the uppermost and lowermost slots 210 on the E-block. Each extension 222 includes a plurality of conductive pads 226 extending to and facing an individual slot 224. Each pad 226 corresponds to an individual one of tabs 216 of ribbons 214. With the ribbons 214 in place and fins 218 assembled into slots 210, the individual tabs 216 protrude through slots 224 in substrate 220 adjacent each pad 226. Tabs 216 are thereupon bent into contact with an individual pad 226 and soldered in place, such as by reflow soldering.

Figure 14:
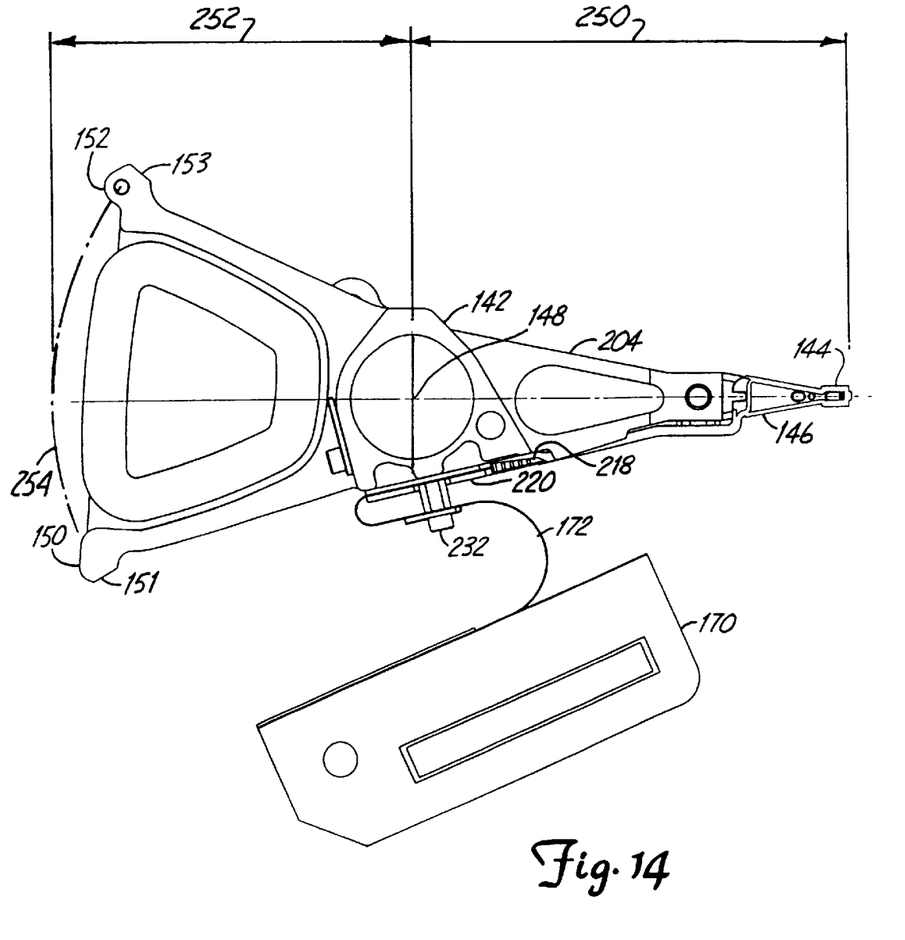
FIG. 14 is a top view of the actuator assembly illustrated in FIG. 12 with the conductors in place.
Figure 15:
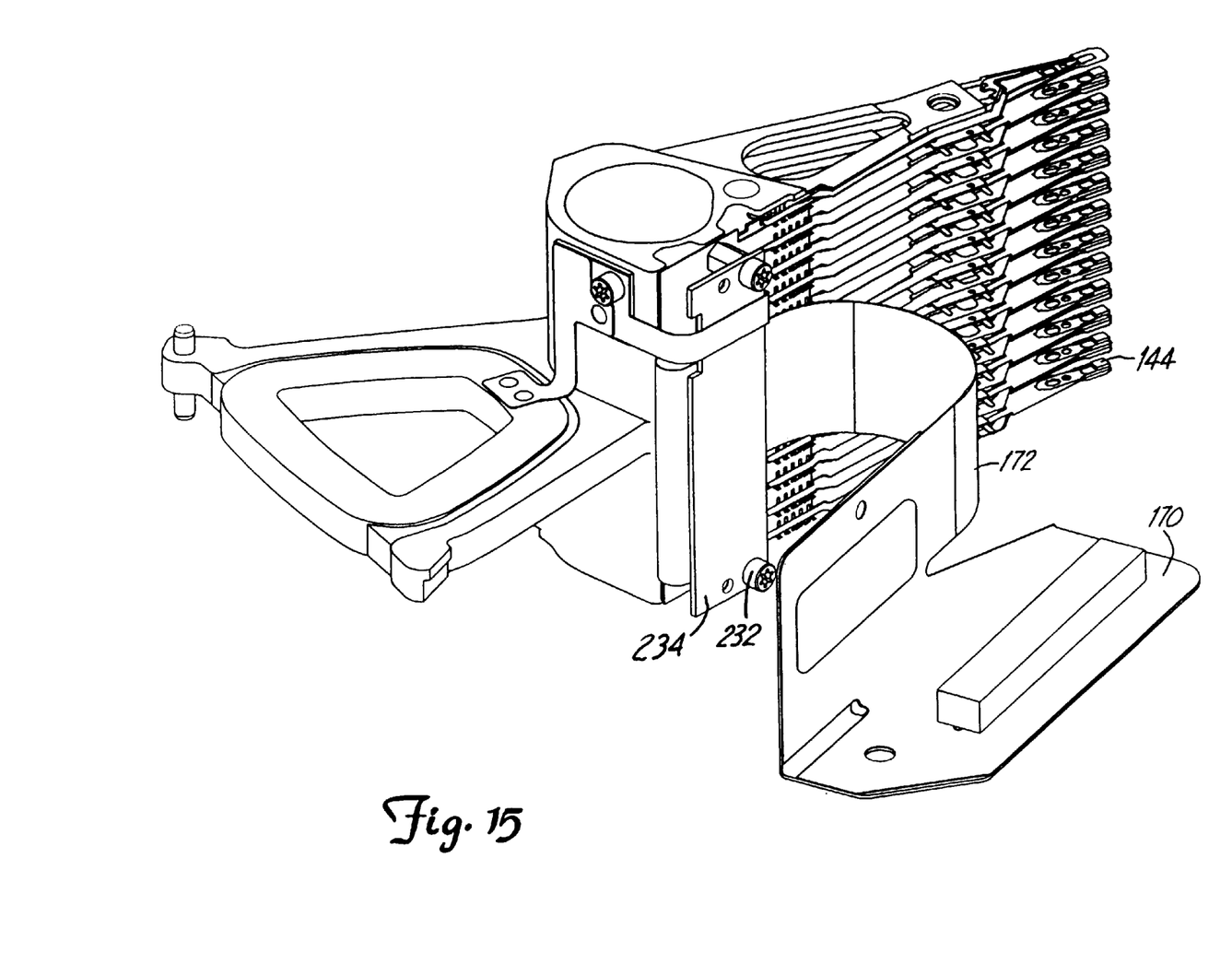
FIG. 15 is a perspective view of the complete actuator assembly of the disc drive illustrated in FIGS. 3 and 4.

As shown particularly in FIGS. 14 and 15, flexible circuit 172 provides a flexible connection to substrate 220 and is mounted thereto and sandwiched against E-block 142 by fasteners 232. As shown particularly in FIG. 15, stiffener plate 234 sandwiches the assembly together to rigidly connect flex circuit 172 to substrate 220 and to the E-block. Stiffener plate 234 provides a rigid mount of substrate 220 to the E-block and substrate 220 fixedly positions ribbons 214 and their respective fins in the respective slots in the E-block. Because fins 218 extend into the E-block and are held in their respective slots 210 by the rigid fastening of tabs 216 to substrate 220 which is rigidly positioned by stiffener plate 234, fins 218 cannot accidentally separate from slots 210. Consequently, fins 218 may be loosely received in the slots, and held in place by stiffener plate 234.

The connector assembly of the present invention may be largely assembled outside the disc drive. More particularly, heads and suspensions are assembled to load arms 146 which are swagged to the actuator arms of the E-block. Ribbons 214 are connected to the heads and assembled into the slots 210 in load arms 146 and the E-block. Substrate 220 is assembled to the E-block. Due to the nesting of fins 218 to respective slots 210, ribbons 214 are properly aligned so that the protruding tabs 216 are in alignment with pads 226 on substrate 220. With the alignment completed, tabs 216 are soldered to pads 226 to complete the assembly of the ribbons to the E-block. Flex circuit 172 is then connected to substrate 220 and stiffener plate 234 is mounted to the E-block. Final assembly is accomplished by assembling actuator assembly into the drive housing and connecting flex circuit 172 to bulkhead connector 170 (FIG. 1).

During assembly, ribbons 214 are held in place in slots 210 in the E-block by virtue of fins 218 extending more deeply into the slots 210 in the E-block directly opposite the connection of tabs 216 to the substrate. With the opposite ends of ribbons 214 being connected to the load arms by the adhesive attachment of terminations 228, a small tension is imposed on ribbons 214 to hold them in place in the slots for alignment of tabs 216 to pads 226 during soldering. This arrangement ensures that fins 218 remain in slots 210, thereby ensuring that ribbons 214 remain in place during assembly, even though the ribbons and fins are loosely coupled to the slots 210. The solder connection of tabs 216 to pads 226 assures rigid mounting of ribbons 214 to substrate 220 (which in turn is rigidly mounted to the E-block). Moreover, although slots 224 in substrate 220 provide convenient access of the tabs to the exposed surface of the substrate, slots 224 are not necessary for the placement of fins 218 in slots 210, and the fins remain in their respective slots 210 even if slot 224 is not present. Most particularly, as shown in FIG. 3, the tabs 216 of the uppermost and lowermost ribbons do not extend through slots 224 in substrate 220. Instead, these ribbons, like the other ribbons of the assembly, are held in place by fins 218 in slots respective 210.

The present invention thus provides an improved disc drive utilizing a smaller-than-standard disc diameter in a standard disc drive housing configuration without sacrificing overall data capacity. The smaller discs require less power for a given rotational velocity, resulting in the ability to achieve higher spindle speeds and reduced latency without increasing spindle power consumption over that of prior larger, slower drives. Additionally the disc drive exhibits a significant reduction in seek time without increasing data densities.

Although the present invention has been described with reference to preferred embodiments, workers skilled in the art will recognize that changes may be made in form and detail without departing from the spirit and scope of the invention.

What is claimed is:

1. A disc drive assembly including:
    a disc drive housing defining a disc drive chamber containing a stack of rotatable rigid recording discs, an electric motor operatively coupled to the stack of discs for rotating the discs, an actuator assembly supporting transducers for reading data to and writing data from selected discs, and an electric motor operatively coupled to the actuator assembly for positioning the transducers to selected positions relative to the discs, the disc drive housing having a first external surface and a curved external end surface joined to the first surface forming a curved external junction between the first surface and the end surface;
    a cable connector mounted to the disc drive housing, the cable connector including
        a connector housing having a recess, the recess having a first surface and a curved second surface joined to the first surface in a curved junction conforming to at least a portion of the curved junction of the first and end surfaces of the disc drive housing, the first surface of the recess engaging a portion of the first surface of the disc drive housing and the second surface of the recess engaging a portion of the end surface of the disc drive housing so that at least a portion of the curved junction between the first and end surfaces of the disc drive housing is received in the recess and the portion of the curved junction of the first and end surfaces of the disc drive housing engage the curved junction of the first and second surfaces of the recess, and
        a plurality of contacts supported by the connector housing for receiving a connector electrically connected to external circuits and
    a circuit board mounted to the connector housing and to the first surface of the disc drive housing to provide electrical connection to the electric motors and the transducers.

2. The disc drive assembly of claim 1, wherein the connector housing is a female housing arranged to receive a male connector.

* * * * *